United States Patent [19]

Basili

[11] Patent Number: 4,476,990

[45] Date of Patent: Oct. 16, 1984

[54] SLIP AND SKID RESISTANT REEL CARRIER

[75] Inventor: Robert A. Basili, Waldwick, N.J.

[73] Assignee: Plastic Reel Corporation Of America, Elmwood Park, N.J.

[21] Appl. No.: 373,415

[22] Filed: Apr. 29, 1982

[51] Int. Cl.[3] .............................................. B65D 1/40

[52] U.S. Cl. ........................................ 220/83; 220/69; 524/349; 525/232

[58] Field of Search .................... 220/69, 83; 206/404, 206/403; 523/149, 150, 157; 525/98, 232; 524/349

[56] References Cited

U.S. PATENT DOCUMENTS

| | | | |
|---|---|---|---|
| 2,912,410 | 11/1959 | Cole | 525/232 |
| 2,936,926 | 5/1960 | Miller | 220/69 |
| 2,993,876 | 7/1961 | McGlamery | 524/349 |
| 3,297,153 | 1/1967 | Fattori . | |
| 3,307,689 | 3/1967 | Lyman . | |
| 3,490,583 | 1/1970 | Cook | 220/69 |
| 4,109,789 | 8/1978 | Fattori et al. . | |

*Primary Examiner*—George E. Lowrance
*Attorney, Agent, or Firm*—Anthony J. Casella; Gerald E. Hespos

[57] ABSTRACT

Substantially slip and skid resistant reel carriers are disclosed for storing, carrying and shipping reels of motion picture film, videotape, magnetic tape and the like. The reel carriers are molded from compositions comprising from about 75% to 85% by weight of high density polyethylene and from about 15% to 25% by weight of a thermoplastic rubber, such as a styrene-butadiene-styrene block copolymer, by weight of the overall composition. The reel carriers exhibit improved frictional affinity for surfaces and are well suited for shipping, handling and mailing with modern automated equipment.

3 Claims, No Drawings

SLIP AND SKID RESISTANT REEL CARRIER

BACKGROUND OF THE INVENTION

The present invention relates to containers for storing, carrying and shipping reels of motion picture film, videotape, magnetic tape and the like. More particularly, the invention relates to reel carriers molded from a slip and skid resistant plastic material.

Containers molded of high impact plastic having separable fitted covers are presently widely used for storing, carrying and shipping, by mail or otherwise, reels of motion picture film and reels or cartridges of magnetic tape, such as videotape. Two exceptional reel carriers of this type are described in U.S. Pat. No. 3,297,153 which issued to Fattori Jan. 10, 1967 and U.S. Pat. No. 4,109,789 which issued to Fattori et al. Aug. 29, 1978, each patent being assigned to the same assignee as the present invention. The disclosures of these two patents are incorporated herein by reference.

The reel carrier described in U.S. Pat. No. 3,297,153 comprises an open top box having a substantially flat bottom wall and upstanding peripheral side wall. The bottom wall is of a size and shape to receive the flat side of a reel thereon in substantially concentric relation and includes four rounded corners extending beyond the periphery of the reel. A separable fitted cover is provided having a substantially flat top wall shaped to conform to the box bottom wall and downwardly extending side wall which when in the closed position telescopingly engages the box side wall. A pair of registering wells depressed inwardly from the external surfaces of the top wall and bottom wall,respectively,are disposed at each of the four corners. Each set of registering wells includes a pair of aligned apertures therethrough having registering diametrical enlargements. A tubular rotatable latch is provided which extends from the top well to the bottom well. The top end of the latch is provided with a radial flange having a diametrical finger grip flange extending upwardly therefrom. At the opposed lower end of the latch a diametrical set of radial projections extend outwardly from the latch and are adapted to pass through the diametrical enlargements in the apertures of the top and bottom wells. Rotation of the finger grip flange in the top side well rotates the latch, and thus the radial projections at the lower end of the latch, so that they are no longer in alignment with the diametrical enlargements of the bottom side well. This effectively binds the cover to the bottom box of the container for safe and protected carrying, storing and shipping of any reeled contents.

These reel carriers provide a number of distinct advantages over prior art carriers. For example, the self-contained locking means provided in the containers eliminates the need for exterior binding straps. The double thickness side wall construction and high impact strength plastic parts of the container provide a satisfactory degree of shock and stress resistance so that the containers can be air lifted substantially without damaging the container or contents. The containers are neat, attractive, easy to use and may be reused an extended number of times.

The carriers described in U.S. Pat. No. 4,109,789 provide similarly strong and shock resistant reel carriers which are provided with self-contained latch constructions having a dual capacity, namely, of locking the cover of the container to the box bottom and of connecting the locked container to a similar underlying container positioned in stacked nested relation. These cases provide a practical means for interconnecting a plurality of containers adapted to receive one reel into a single shipping unit for shipping multiple reels of related subject matter.

While the advantages of the above-described reel carriers cannot be gainsaid, it has become apparent that the containers could desirably be made more slip and skid resistant. The reel carriers tend to slip or slide on inclined surfaces. In addition, it has been observed that the containers slip when placed on conveyor belt assemblies. The coefficient of friction between the conveyor belts and the reel containers is not high enough to prevent the containers from slipping backwards on upwardly inclined belt segments or from slipping at junctions of two conveyor belt segments. More particularly, because of slippage,effective transfer of the container from one belt segment to another does not always occur. Often, the reel carrier will straddle the junction between the belts and slip at both sides. The reel carrier thus remains stationary in the midst of a flow of moving packages,thereby causing jam-ups in flow which may even knock other packages off of the conveyor belts.

The magnitude of the slippage problem can be appreciated in the context of large scale automated shipping and mailing departments, such as those used in the United States Postal Service. The extremely large volume of packages which are processed makes the problem of flow stoppages, tie-ups, and spill offs even more acute because of the large numbers of other packages which will be effected. The jam-ups often require that the whole processing system be shut down so that the packages can be redistributed on the conveyor belts and normal flow resumed. Packages which fall off of the conveyor belts may often go unnoticed, resulting in serious shipping delays. In any event, the slippage of the reel carriers is costly because additional manpower is required to oversee an otherwise automated system. The United States Postal Service has found the problem so troublesome that it has issued a Postal regulation to the effect that in order for reel carriers to be shipped via the U.S. mail, they must meet minimum slip and skid resistance levels.

Accordingly, it is an object of the present invention to provide a high impact strength reel carrier which is substantially slip and skid resistant on most surfaces.

It is another object of the subject invention to provide a reel carrier for storing, carrying and shipping reels of motion picture film capable of being conveyed by conventional automated shipping equipment which will not slip and slide to cause jam-ups in automated conveyor belt processes.

It is a further object of the subject invention to provide a high impact strength reel carrier acceptable for shipment through the U.S. mail.

It is still another object of the subject invention to provide durable, convenient, and attractive reel carriers which may be reused an extended number of times.

SUMMARY OF THE INVENTION

In accordance with these and many other objects the subject invention provides new and improved reel carriers adapted to receive reels of motion picture film, videotape, magnetic tape and the like. The new and improved reel carriers of the subject invention are formed from a thermoplastic polymer blend molding composition comprising,by weight of the overall composition,from about 75% to 85% by weight of high density polyethylene and from about 15% to 25% by weight of a thermoplastic rubber. In preferred embodiments the reel carriers will be molded from compositions comprising about 80% high density polyethylene and about 20% of thermoplastic rubber. The preferred thermoplastic rubber for use in the subject invention is a styrene-butadiene-styrene block copolymer resin.

The molding compositions for use in the subject invention may be prepared by blending the components in an extruder, and thereafter extruding the mixture into pellets. The pellets are then injection molded to form the reel carrier parts of the subject invention.

The new and improved reel carriers of the subject invention may be of any shape adapted to receive and contain reels of motion picture film, as long as the reel carrier parts are molded from the substantially slip and skid resistant thermoplastic molding compositions for use with this invention. In preferred embodiments, the new and improved slip and skid resistant reel carriers of of the subject invention will be of the type substantially shown and described in U.S. Pat. No. 3,297,153.

The reel carriers of the subject invention are substantially slip and skid resistant on gently inclined planar surfaces. They may be moved by conventional conveyor belts substantially without slippage, and may be transferred from one belt to another. The new and improved reel carriers of the subject invention have been approved by the United States Postal Service for shipment of the carrier through the U.S. mail.

Further objects and advantages of the subject invention will become apparent from the following detailed description of the invention.

DETAILED DESCRIPTION OF THE INVENTION

In accordance with the subject invention, reel carriers, such as those shown and described in U.S. Pat. No. 3,297,153, may be made substantially slip and skid resistant by molding the parts of the reel carrier from a polymer blend molding composition comprising, by weight of the overall composition, from about 75 to 85% of high density polyethylene resin and from about 15 to 25% of a thermoplastic rubber. Especially preferred are molding compositions comprising 80% by weight high density polyethylene and 20% by weight of a thermoplastic rubber. The addition of from 15 to 25% by weight of a thermoplastic plastic rubber to a polyethylene molding composition effectively increases the coefficient of friction of articles molded from said compositions with respect to the surfaces of other articles.

The polyethylene resin component of the molding compositions of the subject invention is of the high density type and is commercially available from a number of sources, such as, Union Carbide Corporation, Phillips Petroleum Company, and Dow Chemical Company, to name but a few. Various commercial low pressure polymerization methods are used to produce high density polyethylene. Although solution and slurry processes, using Ziegler or Phillips type catalysts, have been the two major methods, other technologies such as Union Carbide's gas phase process have gained importance.

More particularly, and by way of example, polyethylene may be prepared in accordance with the Phillips process by contacting ethylene with a slurry of chromium oxide supported on silica-alumina as a polymerization catalyst in an inert solvent, followed by extraction of the polymer from the catalyst with hot solvent, solvent removed after cooling, crystallization of the polymer, and finishing of the polymer. Polymerization may be performed with the catalyst suspended in a diluent liquid giving either solution or suspension polymerization, depending on the reaction temperature. Above 130° C. the diluent liquid becomes a solvent for the polymer, giving a solution polymerization process which can be conducted either with a fixed catalyst bed or as a stirred slurry reaction. Below 130° C. the polymer is insoluble and suspension polymerization may be carried out as a stirred slurry reaction. With a dry catalyst, polymerization may also be run in a fluidized-bed, gas-phase reaction system. The density of the polyethylene from this process is about 0.960–0.970 g/cc.

When pure ethylene is polymerized in these low pressure processes, i.e., at less than 1500 psi, the products contain very few side chains. Structures are therefore quite linear, resulting in high crystallinities and high densities of about 0.955 g/cc to 0.970 g/cc. The density of polyethylene significantly affects many of the physical properties of articles molded therefrom. In general, increasing density increases stiffness, tensile strength, hardness, heat and chemical resistance, opacity and barrier properties, all of which are desirable characteristics for a reel carrier and this is the reason high density polyethylene resins are preferred.

The molding compositions of this invention also comprise from about 15 to 25% of a thermoplastic rubber. The preferred thermoplastic rubber for use with the subject invention is a styrene-butadiene-styrene block copolymer. The styrene-butadiene-styrene block copolymers are generally widely available, such as the product Kraton D 2103 available from Shell Chemical Company. Although the styrene-butadiene-styrene block copolymers are preferred, other thermoplastic rubbers may find application as long as they provide an increased coefficient of friction in the polyethylene based molded articles. For example, other useful elastomers may include: polystyrene which has been blended or grafted with natural or synthetic rubbers such as polybutadiene, styrene-butadiene, ethylene-alpha-olefin-polyene terpolymer, such as EPDM rubber, and the like; and styrene containing copolymers such as styrene-acrylonitrile copolymers, styrene-butadiene copolymers, styrene-acrylonitrile-a-alkyl styrene copolymers, styrene-acrylonitrile-butadiene copolymers, poly-a-methylstyrene, copolymers of ethylvinylbenzene, divinylbenzene, styrene-maleic anhydride copolymers; and block copolymers of styrene-butadiene.

Conventional additives, such as anti-static agents, pigments, mold-release agents, thermal stabilizers, flame retardants and the like may also be incorporated into the molding compositions of the invention in their conventional amounts.

The molding compositions are prepared by conventional methods and generally the components are first blended in an extruder. The screw mechanism within the heating chamber of an extruder effectively distributes the thermoplastic rubber throughout the polyethylene resin. The blended composition is extruded through a die and is chopped to form pellets suitable for injection molding. The open top box and the fitted cover of the reel carriers are formed from the pellets in an injection molding machine by applying heat and pressure according to conventional injection molding techniques.

The new and improved slip and skid resistant reel carriers of the subject invention having parts molded from the thermoplastic rubber-modified polyethylene molding compositions are substantially slip and skid resistant on gently inclined surfaces and exhibit an improved frictional affinity for conveyor belts used in contemporary automated mailing and shipping equipment.

Although the subject invention has been described in terms of a preferred embodiment, modifications or changes therein may be made by those skilled in the art. For example, the molding compositions for use in the subject invention may be based on polypropylene instead of polyethylene. All such modifications or changes are included in the scope and spirit of the subject invention as defined by the appended claims.

What is claimed is:

1. A substantially slip and skid resistant container for storing, carrying, and shipping reels of motion picture film, videotape, magnetic tape and the like, said container comprising an open top box formed of a unitary piece of molded plastic material having a substantially flat bottom wall and upstanding peripheral side wall, said bottom wall being sized and shaped to receive the flat side of a reel thereon in substantially concentric relation; a separable fitted cover for said open top box formed of a unitary piece of molded plastic material having a substantially flat top wall shaped to conform to the open top box; and means for securing said open top box and said cover together, said open top box and said cover each being formed from a polymer blend molding composition comprising from about 75% to 85% by weight high density polyethylene and from about 15% to 25% by weight of a thermoplastic elastomer which comprises styrene-butadiene-styrene block copolymer, by weight of the overall composition, whereby said thermoplastic elastomer in said polymer blend molding composition provides a sufficiently high coefficient of friction to said container to render said container substantially slip and skid resistant when used on conveyer belts.

2. A substantially slip and skid resistant container as recited in claim 1 wherein said molding composition comprises about 80% by weight high density polyethylene and about 20% by weight of a thermoplastic elastomer which comprises styrene-butadiene-styrene block copolymer, by weight of the overall composition.

3. A substantially slip and skid resistant container as recited in claim 1 wherein said high density polyethylene has a density of between about 0.955 g/cc to about 0.970 g/cc.

* * * * *